United States Patent [19]

Eisenberg

[11] 3,891,458

[45] June 24, 1975

[54] ELECTRIC CURRENT PRODUCING GALVANIC CELL

[75] Inventor: Morris Eisenberg, Mountain View, Calif.

[73] Assignee: Electrochimica Corporation, Mountain View, Calif.

[22] Filed: Nov. 15, 1973

[21] Appl. No.: 416,073

[52] U.S. Cl. ......... 136/6 LN; 136/83 R; 136/100 R; 136/155
[51] Int. Cl. ......................................... H01m 43/06
[58] Field of Search ..... 136/6 LN, 20, 83 R, 100 R, 136/154–155, 137, 121

[56] References Cited
UNITED STATES PATENTS

| | | | |
|---|---|---|---|
| 3,415,687 | 12/1968 | Methlie | 136/100 R |
| 3,493,433 | 2/1970 | Hoffmann | 136/100 R |
| 3,567,515 | 3/1971 | Maricle et al. | 136/6 LN |
| 3,681,144 | 8/1972 | Dey et al. | 136/83 R |

*Primary Examiner*—Anthony Skapars
*Attorney, Agent, or Firm*—Robert B. Kennedy

[57] ABSTRACT

A galvanic cell is disclosed comprising a porous cathode and an anode including a metal less noble than zinc selected from the group consisting of lithium, sodium, magnesium, calcium and aluminum. The cell also includes an electrolyte for electrolytic conduction between the cathode and anode which electrolyte comprises a solvent including thionyl chloride. A first solute consisting essentially of a salt of the selected anode metal is dissolved in the solvent in a concentration of between 0.5 and 3.0 moles per liter. A second solute selected from the group of compounds consisting of phosphoryl chloride, sulfolane, sulfur dioxide and mixtures thereof is also dissolved in the solvent in a concentration of between 0.5 and 6.0 moles per liter.

13 Claims, No Drawings

ELECTRIC CURRENT PRODUCING GALVANIC CELL

BACKGROUND OF THE INVENTION

This invention relates generally to galvanic cells, and particularly to galvanic cells of the type employing thionyl chloride as an inorganic electrolytic solvent.

Thionyl chloride is well known as an inorganic electrolytic solvent for galvanic cells. This use is described, for example, on page 234 of *Non-Aqueous Solvents* (1953) by Audrieth and Kleinberg.

Although thionyl chloride has the attribute of being an inorganic solvent in which a large number of salts of diverse compositions may be dissolved, it also can be readily reduced like other oxychlorides at the cathode surface of a galvanic cell, thus acting as a cathodic depolarizer as well as a solvent. In high rate applications, however, electrolytes using pure thionyl chloride as solvent fail to yield high coulombic efficiencies in cells using lightweight metals, e.g., lithium as anodes.

Accordingly, it is a general object of the present invention to provide an improved galvanic cell employing thionyl chloride as an electrolytic solvent.

More specifically, it is an object of the invention to provide an improved galvanic cell comprising an anode composed of one or more relatively light weight metals less noble than zinc, and an electrolytic solvent including thionyl chloride.

Other objects of the invention are to provide a galvanic cell employing a metal less noble than zinc such as lithium as an anode, and an electrolytic solvent including thionyl chloride, which cell is relatively stable and develops high coulombic efficiencies.

SUMMARY OF THE INVENTION

Briefly described, the present invention resides in the discovery of a unique and as yet not fully understood synergistic effect which occurs with the addition of certain sulfur and phosphor compound solutes to that of certain salt solutes when dissolved in thionyl chloride. Galvanic cells employing the resulting electrolyte have been found to have increased cell capacities and coulombic efficiencies.

In a preferred form of the invention a galvanic cell is provided comprising a porous cathode and an anode including a metal less noble than zinc selected from the group consisting of lithium, sodium, magnesium, calcium and aluminum. An electrolyte is provided for electrolytic conduction between the cathode and anode with the electrolyte comprising a solvent including thionyl chloride. A first solute is dissolved in the solvent consisting essentially of a salt of the selected anode metal. A second solute is also dissolved in the solvent selected from the group of compounds consisting of phosphoryl chloride, sulfolane, sulfur dioxide and mixtures thereof.

DETAILED DESCRIPTION OF EXEMPLARY EMBODIMENTS

EXAMPLE 1

Cylindrical cells 1 inch in diameter by 2 inches in length were constructed by coiling an inert cathode with a lithium anode. The cathode, ½ inches by 8 inches, was hot pressed at 200°C to an expanded nickel screen, from a mixture consisting of 80% acetylene black, 17% graphite and 3% teflon powder as binder. The lithium anode, 1½ inches wide by 9 inches long, was rolled to a thickness of 0.015 inches. A fiberglass separator was placed between the two electrodes which were then coiled and inserted into a nickel plated steel can. With proper connections spotwelded, the cell was filled with 10cc of electrolyte and sealed. The electrolyte consisted of a 1.5 molar solution of lithium chloroaluminate in thionyl chloride. The cell was discharged under a 5 ohm load. It operated at an average voltage of 3.25 volts and delivered current for 3.8 hours thereby giving a cell capacity of 2.46 ampere-hours.

EXAMPLE 2

Identical cells were filled with the same quantity as in Example 1 of an electrolyte consisting of a 1.5 molar solution of lithium chloroaluminate in thionyl chloride in which sulfur dioxide was also dissolved to a concentration of 3 moles per liter. When discharged, these cells delivered a somewhat higher voltage of 3.3 volts, but operated for 6.2 hours, thus delivering a capacity of 4.1 ampere-hours.

EXAMPLE 3

Identical cells to that described in Example 1 were now filled with 10cc of an electrolyte consisting of a 1.5 molar solution of lithium chloroaluminate in thionyl chloride in which also sulfolane was dissolved to a concentration of 3 moles per liter. These cells operated for 5.2 hours thus delivering a capacity of 3.4 ampere-hours.

EXAMPLE 4

Identical cells as in Example 1 were now filled with an electrolyte consisting of 1.8 moles per liter lithium chloroaluminate in thionyl chloride to which phosphoryl chloride was added to a concentration of 1.5 moles per liter and sulfur dioxide also to a concentration of 4.5 moles per liter. The same amount of electrolyte as above was added and the cells sealed and discharged. At an average voltage of 3.3 volts they yielded 6 hours of operation or 3.86 ampere-hours upon discharge.

EXAMPLE 5

Cylindrical cells similar to that described in Example 1 were built using a cathode pressed to an expanded nickel screen using a mixture consisting of 40% acetylene black, 15% graphite, 10% carbon black, 15% active vegetable carbon, 16% coke and 4% teflon powder as binder. A magnesium anode one and a half inches by nine inches by 0.015 inches was rolled in together with a fiberglass separator to produce a coil. The coil was filled with 11cc of an electrolyte consisting of 1.85m solution of magnesium chloroaluminate in thionyl chloride in which also sulfolane was dissolved to a concentration of 1.5m/L. The cell was discharged under a 20 ohm load and operated for a period of 21.5 hours at an average voltage of 2.9 volts for a delivered capacity of 3.1 ampere-hours.

EXAMPLE 6

Similar cylindrical cells were pressed with a cathode mix containing 65% acetylene black, 15% active carbon charcoal, 16% graphite and 4% teflon power as binder. A lithium anode and a fiberglass separator similar to that of Example 1 was used. The cell was filled with 10.6cc of electrolyte consisting of 1.7 molar solution lithium chloroborate in thionyl chloride in which sulfur dioxide and sulfolane were both dissolved to a concentration of 1.5 m/L each. When discharged under a 5 ohm load these cells delivered a voltage of 3.15 volts for a period of 6.2 hours thereby delivering 3.9 ampere-hours in capacity.

It should be understood that the just described examples are provided to illustrate principles of the invention in preferred, specific forms. Many modifications and additions may, of course, be made to the individual examples without departure from the spirit and scope of the invention as set forth in the following claims.

I claim:

1. A galvanic cell comprising:
    A. a porous solid cathode;
    B. an anode including a metal less noble than zinc selected from the group consisting of lithium, sodium, magnesium, calcium and aluminum; and
    C. an electrolyte for electrolytic conduction between said anode and cathode consisting essentially of thionyl chloride in which is dissolved
        a. a first solute consisting essentially of a salt of the selected anode metal in a concentration of between 0.5 and 3.0 moles per liter, and
        b. a second solute selected from the group of compounds consisting of phosphoryl chloride, sulfolane, sulfur dioxide, and mixtures thereof in a concentration of between 0.5 and 6.0 moles per liter.

2. The galvanic cell of claim 1 wherein said first solute is a perchlorate of the selected anode metal.

3. The galvanic cell of claim 1 wherein said first solute is a tetrachloroaluminate of the selected anode metal.

4. The galvanic cell of claim 1 wherein said first solute is a tetrachloroborate of the selected anode metal.

5. The galvanic cell of claim 1 wherein said first solute is a hexachloroarsenate of the selected anode metal.

6. The galvanic cell of claim 5 wherein said first solute is a hexachloroantimonate of the selected anode metal.

7. The galvanic cell of claim 1 wherein said anode includes lithium and wherein said first solute is selected from the group of lithium salts consisting of lithium perchlorate, lithium chloroaluminate, lithium tetrachloroborate, lithium hexachloroarsenate and lithium hexachloroantimonate.

8. The galvanic cell of claim 1 wherein said anode includes magnesium and wherein said first solute is selected from the group of magnesium salts consisting of magnesium perchlorate, magnesium chloroaluminate, magnesium tetrachloroborate, magnesium hexachloroarsenate and magnesium hexachloroantimonate.

9. The galvanic cell of claim 1 wherein said anode includes lithium and said first solute consists essentially of lithium chloroaluminate.

10. The galvanic cell of claim 9 wherein said second solute consists of a mixture of two members of the group of compounds consisting of phosphoryl chloride, sulfolane and sulfur dioxide.

11. The galvanic cell of claim 1 wherein said porous cathode comprises carbon.

12. The galvanic cell of claim 1 wherein said second solute is sulfolane.

13. The galvanic cell of claim 1 where said second solute is phosphoryl chloride.

* * * * *